United States Patent
Kato

(10) Patent No.: US 6,205,625 B1
(45) Date of Patent: Mar. 27, 2001

(54) WELD STUD

(75) Inventor: Hiroyuki Kato, Aichi (JP)

(73) Assignee: Emhart Inc., Newark, DE (US)

( * ) Notice: Subject to any disclaimer, the term of this patent is extended or adjusted under 35 U.S.C. 154(b) by 0 days.

(21) Appl. No.: 09/344,430

(22) Filed: Jun. 25, 1999

(30) Foreign Application Priority Data

Jul. 6, 1998 (JP) .................................................. 10-190525

(51) Int. Cl.⁷ ............................ F16B 39/00; F16B 37/00
(52) U.S. Cl. .............................. 24/297; 24/336; 411/258; 411/171
(58) Field of Search ...................... 24/270, 16 PB; 248/68.1; 411/508, 509, 510, 913, 171, 258, 930; 403/13, 408.1

(56) References Cited

U.S. PATENT DOCUMENTS

| | | |
|---|---|---|
| 3,909,883 | 10/1975 | Fegen . |
| 4,541,153 * | 9/1985 | Schäty ................................ 24/336 X |
| 4,636,124 * | 1/1987 | Gugle et al. ....................... 411/258 X |
| 4,822,224 * | 4/1989 | Carl et al. ......................... 411/258 X |
| 4,824,304 * | 4/1989 | Shibayama et al. .................. 411/171 |
| 5,005,265 | 4/1991 | Muller . |
| 5,062,382 | 11/1991 | Matsuda . |
| 5,143,500 | 9/1992 | Schuring et al. . |
| 5,253,965 * | 10/1993 | Angel ................................. 411/258 X |
| 5,601,260 * | 2/1997 | Shinohara et al. .................... 248/68.1 |
| 5,660,513 * | 8/1997 | Shibanushi ............................ 411/433 |
| 5,716,161 | 2/1998 | Moore et al. . |
| 5,795,118 * | 8/1998 | Osada et al. ........................... 411/171 |
| 5,803,413 * | 9/1998 | Benoit et al. ............................ 248/73 |

FOREIGN PATENT DOCUMENTS

| | | |
|---|---|---|
| 3908367 | 7/1990 | (DE) . |
| 57-21806 | 4/1982 | (JP) . |
| 60-203547 | 10/1985 | (JP) . |
| 4-81357 | 3/1992 | (JP) . |

* cited by examiner

Primary Examiner—Robert J. Sandy
(74) Attorney, Agent, or Firm—Edward D. Murphy

(57) ABSTRACT

A weld stud comprises a leg portion having a root that is adapted to be welded to a workpiece and a resilient engagement pawl portion integrally formed at least on one side of the leg portion. The resilient engagement pawl portion extends diagonally outwardly from the end of the leg portion toward the root and is capable of bending radially inwardly with respect to the leg portion. On the outside of a lower end portion of the leg portion, an engagement step which is an inward recess formed like a step is provided. Although it is not always necessary to make the weld stud from synthetic resin, it is preferable that the entire weld stud is made of synthetic resin and is molded as a one-piece article since its use is predominantly for synthetic resin members.

4 Claims, 3 Drawing Sheets

WELD STUD

BACKGROUND OF THE INVENTION

The present invention relates to a weld stud which is welded to a workpiece and attaches a component to the workpiece, and an attachment assembly using the weld stud. More specifically, the present invention relates to a weld stud which is effective in being utilized, but not limited, as a synthetic resin weld stud to be welded to a box member made of synthetic resin such as a dashboard or some other structural part of an automobile, or a cowling of a motorcyle.

Conventionally, in a clip assembly commonly used for attaching a component on a box member made of synthetic resin such as a dashboard of an automobile or a cowling of a motorcycle, as shown in FIG. 1, the root of a weld stud 1 having an engagement step 1a at a longitudinally mid portion is welded to a box panel 2, and a clip 3 comprises a tubular leg portion 3a with an inner diameter enough to receive the stud 1 and a disc-like head 3b formed on an upper end of the leg portion. The clip 3 is brought into engagement with the stud 1, thereby holding another component 4 sandwiched between the head 3b and the box-like panel 2. To make the clip 3 engage with the stud 1, resilient engagement pawls 3 are provided in the manner that they extend inwardly with respect to the tubular leg portion 3a of the clip 3c, and the engagement pawls 3c are brought into engagement with the engagement step 1a of the stud 1.

For this conventional attachment assembly, different clips have to be prepared correspondingly to components to be attached. Further, forming the engagement pawls in the clip needs complicated metal molds, which should be made for the respective types of clips, resulting in an increase in manufacturing costs. Difficulty in removing the clip after attached is another problem of this type of conventional attachment assemblies.

SUMMARY OF THE INVENTION

Noting such problems in the conventional component attachment assemblies, the present invention aims to provide an attachment assembly which can be used in common with various components to be attached without being changed depending on the various components and be removed easily after mounted and, further, to provide a weld stud for use with the above attachment assembly.

In order to attain the above object, a weld stud according to the present invention comprises a leg portion having a first end and a second end spaced from the first end, a flat mounting seat adapted to be welded to a workpiece and integrally formed with the leg portion, and a resilient engagement pawl portion integrally formed on at least one side of the leg portion. The resilient engagement pawl portion extends diagonally outwardly from the first end of the leg portion toward the second end to be capable of bending radially inwardly with respect to the leg portion, and an engagement step which is an inward recess formed on an intermediate outside portion of the resilient engagement powl portion. Although a weld stud according to the present invention is not necessarily made of synthetic resin, it is preferred that the weld stud is made of synthetic resin and is molded as a one-piece article since its use is predominantly for synthetic resin members.

In a preferred embodiment of the present invention, the leg portion is formed to have substantially flat surfaces on both sides thereof and engagement pawl portions in a pair are formed respectively along the substantially flat surfaces on both sides of the leg portion.

According to the present invention, there also is provided an attachment assembly comprising a weld stud of any of the above-described types and a clip including an engagement portion to engage with the weld stud. In this case, the clip is formed with a hole having a radius as sized so as to allow the engagement pawl portion or portions of the weld stud to bend and pass therethrough. The clip is provided with a substantially flat engagement surface defining an engagement portion on the upper peripheral surface of the hole.

In the attachment assembly using the weld stud of the present invention, it is not essential to use a clip to engage with the stud. In a case of using no clip, a component to be attached may be formed with an attachment portion having an engagement portion or an engagement surface to engage with the stud. In those attachment assemblies, less kinds of weld studs than the clips can be used and the same type of the clip can be used in different places, so that manufacturing costs can be reduced by providing engagement means in the stud itself Even in another case of using a clip, only a hole should be formed in the clip, so that the manufacture cost of the clip can be reduced. Besides, according to the structure of the engagement pawl portion of the stud of the present invention, after the weld stud is attached, the engagement pawl portion can be bent from outside to allow the component to be removed.

DETAILED DESCRIPTION OF THE INVENTION

Figure 1:
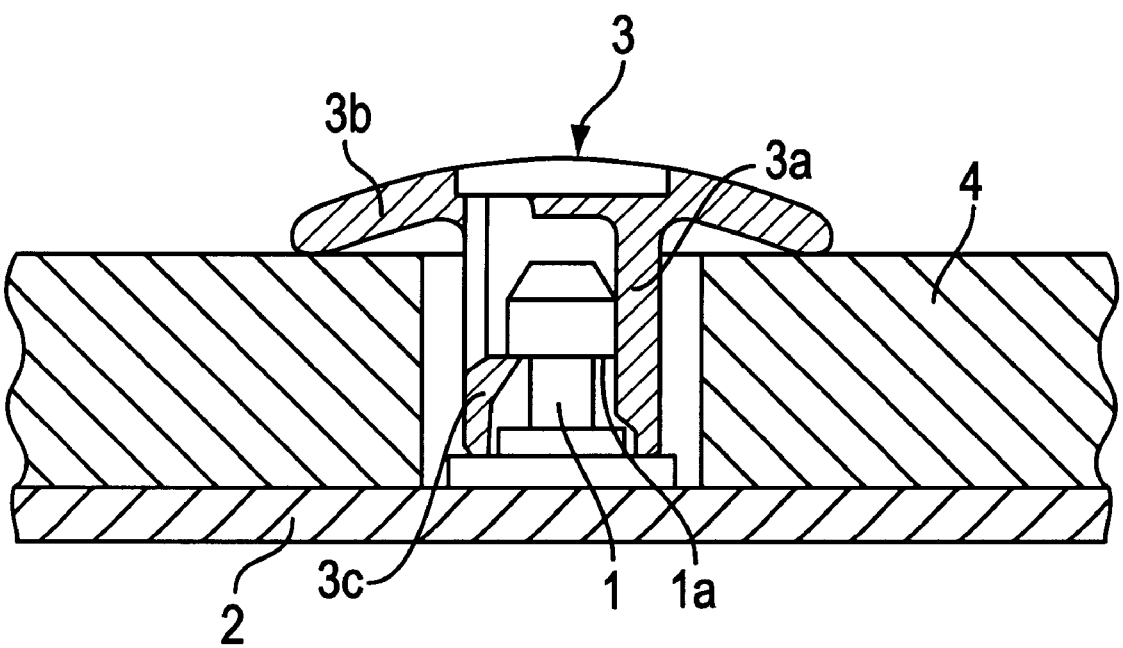
FIG. 1 is a sectional view showing an example of a component attachment assembly of a conventional structure.
Figure 2A:
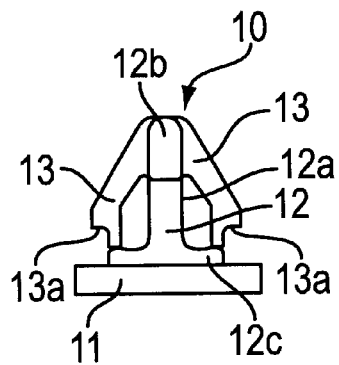
FIG. 2(a) and FIG. 2(b) show a front view and a side view, respectively, of an embodiment of a weld stud of the present invention.
Figure 2B:
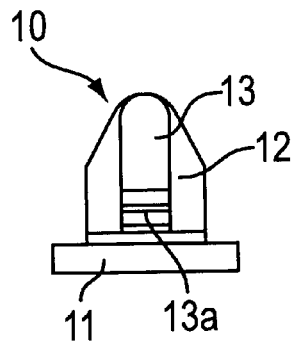

The present invention is described further by way of an embodiment, with reference to accompanying drawings, FIG. 2(a) and (b) are a front view and a side view, respectively of a weld stud 10 of an embodiment according to the present invention. The stud 10 has an appropriate flat mounting seat 11 which is, for example, a circle in the form, and a mounting leg portion 12 which extend upwardly from the mounting seat 11 and has flat sides 12a. Along the flat sides 12a of the mounting leg portion 12, a pair of resilient engagement pawl portions 13 are formed so as to extend diagonally outwardly from a first end 12b of the leg portion 12, formed with the seat 11, and toward a second end 12c of the leg portion. In an intermediate outside portion of each of the resilient engagement pawl portions 13 between the first end 12b and the second end 12c, an engagement step 13a is formed as an inward recess.

Figure 3:
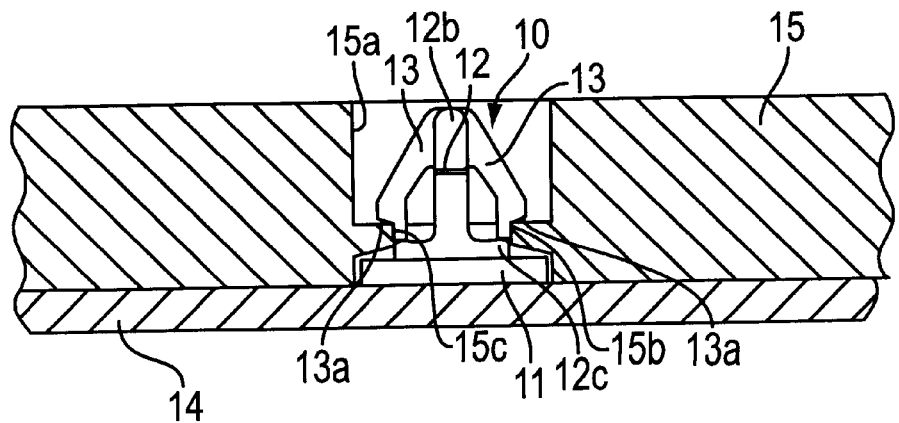
FIG. 3 is a sectional view showing an example in which the stud of FIG. 2(a) is used without a mounting clip.

Preferably, the weld stud is made of synthetic resin and is formed as a one-piece article. For example, as shown in FIG. 3, the stud 10 is welded at its mounting seat 11 to a workpiece panel such as a box panel 14 made of synthetic resin. In FIG. 3, an attachment component 15 is mounted directly on the box panel 14, without using any mounting clip. In this example, the attachment component 15 is formed with a first hole 15a to be penetrated by the stud 10. On the inner wall of the hole 15a, an inwardly projecting engagement portion 15b is formed. The engagement portion 15b is formed with a second hole 15c which is concentric with the hole 15a, but having a smaller diameter. The smaller diameter of the hole 15c is sized to allow 16c having a radius sized to allow the engagement portions 13 to bend and pass therethrough, and the top surface of the engagement portion 15b defines an engagement surface. The attachment component 15 is fixed onto the box panel 14 when the engagement steps 13a of the engagement pawl portions 13 of the stud 10 come into engagement with the engagement surface on the top of the engagement portion 15b of the attachment component 15.

Figure 4:
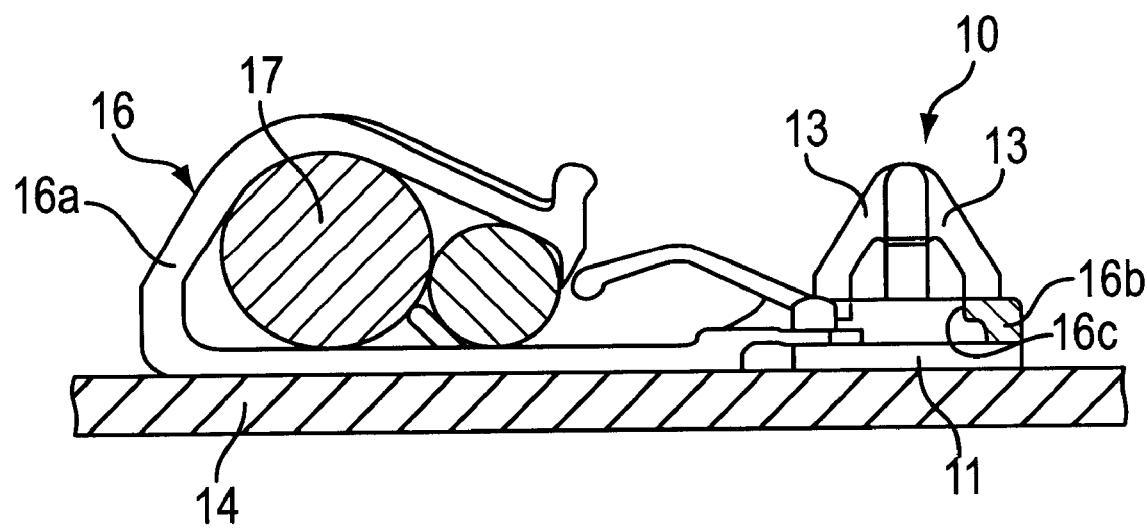
FIG. 4 is a sectional view showing an example in which a component is attached by means of the stud of FIG. 2(a) using a mounting clip.

FIG. 4 shows an example of using the embodiment weld stud 10 of the present invention for mounting a clip 16 for an electric wire. The clip 16 has a holder portion 16a to hold a wire 17 or the like and a mounting portion 16b formed integrally at an end portion of the holder portion 16a. The mounting portion 16b may be a simple, disc-like member. It suffices that the mounting portion 16b is formed with, for example, a round hole 16c having a radius sized to allow the engagement pawl portions 13 of the stud 10 to bend and pass through. In this case, the top surface of the mounting portion 16b defines an engagement surface. Since the mounting portion 16b of the clip 16 can be in a simple annular form, manufacturing costs will be reduced remarkably.

In the above embodiment, the engagement pawl portions 13 of the stud 10 are formed on both sides of the leg portion 12. Nevertheless, the engagement pawl portion formed only on one of the side can satisfactorily fulfil the intended function. It is also possible that the weld stud is made of metal such as iron-based metal.

What is claimed is:

1. A weld stud comprising a leg portion having a first end, and a second end spaced from the first end, a flat mounting seat adapted to be welded to a workpiece and integrally formed with the leg portion, a resilient engagement pawl portion integrally formed on at least one side of the leg portion, wherein the resilient engagement pawl portion extends diagonally outwardly from the first end of the leg portion and toward the second end to be capable of bending radially inwardly with respect to the leg portion, and the resilient engagement pawl portion is provided with an engagement step at an intermediate outside portion thereof formed as an inward recess.

2. The weld stud according to claim 1 wherein the leg portion is formed to have substantially flat surfaces on both sides thereof and the engagement pawl portions in a pair are formed along the substantially flat surfaces on both sides of the leg portion, repectively.

3. A weld stud according to claim 1 or 2 wherein the weld stud as a whole is made of synthetic resin and is integrally molded.

4. A mounting assembly comprising a weld stud according to any one of claims 1 and 2, and a clip having an engagement portion to engage with the weld stud, and wherein the clip is formed with a hole having a radius being sized so as to allow the engagement pawl portion or portions of the weld stud to bend and pass therethrough, and is also provided with a substantially flat engagement surface defining said engagement portion on an upper peripheral surface of the hole.

* * * * *